Patented Dec. 29, 1936

2,065,928

UNITED STATES PATENT OFFICE

2,065,928

PRODUCTION OF FINELY DIVIDED VAT COLORS

William R. Waldron, Wilmington, Del., assignor to E. I. du Pont de Nemours & Company, Wilmington, Del., a corporation of Delaware No Drawing. Application April 14, 1934, Serial No. 720,570

3 Claims. (Cl. 260—31)

This invention relates to the production of finely divided vat dyestuffs, and more particularly the production of these dyestuffs in very fine physical or amorphous form, for use in cotton textile printing, in the padding method of dyeing cotton goods, and for use as pigments.

Vat dyestuffs directly as obtained in their manufacture are as a rule coarsely crystalline or agglomerated into relatively large particles, whose covering power, for such purposes as printing or paint manufacture, is too low for practical purposes. Furthermore, experience has shown that this effect cannot be efficiently or economically overcome by mechanical methods, such as grinding.

It has been customary in the art, therefore, to reduce the size of the solid particles of indanthrone, by acting upon the same with sulfuric acid whereby to produce a sulfate, and drowning the product in water to decompose this sulfate into the original dyestuff and sulfuric acid. During the latter step recrystallization of the dyestuff occurs, with the result that the same is precipitated in a new form, varying in fineness from amorphous and ultra-finely crystalline to coarsely crystalline, depending on the conditions of operation.

A great many patents have been issued in Germany on the above-mentioned process. Practically all of these teach that the size of the ultimate average particle must be controlled by such factors as concentration of sulfuric acid in the first step, the quantity thereof, that is, whether sufficient to dissolve the entire mass or only to produce a magma, and the temperature employed during this step.

I have now found that the form of the reprecipitated dyestuff, that is, whether crystalline or amorphous, as well as the size of the ultimate particle, is very critically controlled by the temperature of the water in which the sulfate is drowned and by the final concentration of sulfuric acid of the drowned mass. More particularly, I have found that very fine crystalline particles may be obtained if the drowning is effected in hot, substantially boiling, water. Also, when the quantity of water is such as to reduce the concentration of the acid to below 15%, say to about 10 to 12% by weight, the particles obtained are extremely fine, almost amorphous.

Based on this discovery, my novel process consists of modifying the physical form of a vat dyestuff, to produce the same in a finely divided, crystalline or amorphous state, by dissolving first the entire dyestuff in concentrated sulfuric acid and then pouring the mass into a predetermined volume of water, depending on the amount of acid employed and being calculated so as to give an ultimate acid concentration of less than 30%, the water being maintained at or above its boiling point during this process. It will be noted that due to the increasing acidity of the drowning mass, its boiling point may rise above 100° C. during the process, without resort to superatmospheric pressure.

I found that it is not necessary to limit the quantity of the sulfuric acid during the sulfation step to that capable of producing a magma only of the color. On the contrary, best results are obtained by employing sufficient sulfuric acid to just dissolve the entire mass. Aside from this point, all the improvements and fine points of control taught in the art may be practiced in my process with advantageous results.

I found further that my process is not limited to indanthrone, but may be applied to any vat dyestuff which does not undergo decomposition when dissolved in sulfuric acid. As such other types of dyestuffs to which my process is applicable, may be mentioned flavanthrone, pyranthrone, dibenzanthrone, isodibenzanthrone, tetrabromindigo, and various derivatives of these.

Without limiting my invention to any particular procedure, the following examples, in which parts by weight are given, will serve to illustrate my preferred mode of operation.

Example I

Ten parts of Ponsol Blue R ("Colour Index" #1106) are dissolved in 100 parts of 98–100% sulphuric acid at 30–50° C. After stirring for ½ hour, the charge is tested microscopically for complete solution of the color. When completely dissolved, the charge is drowned slowly in 300 parts of boiling water, so that at the completion of the drowning, the acid concentration will be between 25 and 30%. After cooling, the color is isolated by filtration and is washed acid-free.

The color, so obtained, consists of very fine crystals, as well as a small amount of agglomerated crystals of the same size. After grinding thoroughly in a colloid mill, perferably in the presence of caustic and a dispersing agent, to break down all agglomerates, (German Patent No. 355,736), the paste is suitable for pigment use.

Example II

Ten parts of Ponsol Yellow G ("Colour Index" #1118) are dissolved in 100 parts of sulphuric acid of 95–100% strength at 35–50° C. When the color is completely dissolved, as shown by a microscopic test, the acid solution of the color is drowned slowly in 700 parts of boiling water to give an acid concentration at the end of approximately 12½% sulphuric. After cooling, the charge is filtered and washed acid free. The color thus formed consists of very fine crystals which are so small that they are practically amorphous.

It will be understood that in this example a final concentration of 12.5% was chosen merely for convenience. If sufficiently large apparatus is available, the final dilution may be brought down to 5% or even lower.

*Example III*

Ten parts of Ponsol Blue BCS ("Colour Index" #1114) are dissolved in 100 parts of sulphuric acid of 95–99% strength, at 35–40° C. When completely dissolved, as shown by a microscopic test, the color solution is drowned slowly in 300 parts of boiling water. After dilution and cooling, the charge is filtered and washed acid free.

After grinding in a colloid mill, as described in Example I, the color paste is satisfactory for use in the pad-jig-reduction method of dyeing (see U. S. P. 1,750,942). In this method, the finely divided color is employed as a pigment, in that the goods is dipped into a weak suspension of the color paste in water. The excess of liquid is squeezed out, and the color adhering to cloth is reduced in a vat by the usual methods. In this type of dyeing it is essential that the color paste be of uniform pigment shade and that it be extremely finely divided to obtain the greatest pigment strength, and these aims are attained to an excellent degree by the method of this invention.

It will be understood that my invention is not limited to the specific details given in the above illustrative examples, but may be varied within wide limits, without departing from the spirit of this invention.

Pigments produced by my novel process possess greater brilliance and strength than those obtainable by the methods of the art. Also, they are of high uniformity in both physical and chemical composition, and when used for dyeing by the jig-padding method, produce uniform, level dyeings, free of specks, and of superior quality.

I claim as my invention:

1. A process for producing an anthraquinone dyestuff in finely divided crystalline form, which comprises treating said dyestuff with a sufficient quantity of concentrated sulfuric acid to completely dissolve the same, and then pouring the mass into a volume of water sufficient to reduce the concentration of the acid to between 5 and 30% by weight, the water being maintained during this procedure at a temperature between 80 and 115° C.

2. A process for producing an indanthrone dyestuff in finely divided form, consisting of ultra fine crystalline particles, which comprises treating said dyestuff with a sufficient quantity of concentrated sulfuric acid to completely dissolve the same, and then pouring the mass into a volume of water sufficient to reduce the concentration of the acid to less than 15% by weight, the water being maintained during this procedure at a temperature substantially near its boiling point.

3. A process as in claim 2, being followed by the steps of filtering off the dyestuff and finishing it by grinding in the presence of alkali and a dispersing agent.

WILLIAM R. WALDRON.